United States Patent [19]

Hall

[11] 4,257,005
[45] Mar. 17, 1981

[54] FIXED INTERVAL VARIABLE PERIOD PULSE RATE MEASURING METHOD AND SYSTEM AND TACHOMETER SYSTEM USING SAME

[76] Inventor: David S. Hall, 238 Calvary St., Waltham, Mass. 02154

[21] Appl. No.: 41,686

[22] Filed: May 23, 1979

[51] Int. Cl.³ .......................... G01P 3/48; G01P 3/54
[52] U.S. Cl. .................................. 324/166; 324/78 R; 235/42 F; 328/130; 368/118
[58] Field of Search ............. 324/166, 175, 186, 78 R, 324/78 D, 83 D, 83 A, 79 D; 328/129, 130, 122; 235/92 TF; 368/118, 119

[56] References Cited

U.S. PATENT DOCUMENTS

| 3,757,167 | 9/1973 | Yoshikawa et al. | 324/166 |
| 4,056,778 | 11/1977 | Randazzo | 324/166 |

Primary Examiner—Alfred E. Smith
Assistant Examiner—Thomas P. O'Hare
Attorney, Agent, or Firm—Joseph S. Iandiorio

[57] ABSTRACT

A fixed interval, variable period technique for measuring pulse rate including defining the start and the end of a fixed measuring interval, counting the pulses whose rate is to be measured beginning in response to the start of the measuring interval and stopping in response to the end of the measuring interval; measuring the period of time between the occurrence of the first counted pulse and the last counted pulse; and dividing the number of pulses counted during a measuring period by the period to determine the pulse rate.

13 Claims, 3 Drawing Figures

FIXED INTERVAL VARIABLE PERIOD PULSE RATE MEASURING METHOD AND SYSTEM AND TACHOMETER SYSTEM USING SAME

FIELD OF INVENTION

This invention features a fixed interval, variable period pulse rate measuring method and system and a tachometer system using that pulse rate measuring technique.

BACKGROUND OF INVENTION

One technique currently applied in tachometer systems to measure speed, counts, for a fixed period of time, pulses generated as a function of tachometer shaft motion. At low speeds when shaft rotation is slow, the number of pulses generated is low and the accuracy of the system is poor. One approach to improve the number of pulses produced and the accuracy at low speeds is to use step-up gear train between the sensing wheel and shaft to increase the speed of the shaft. This increases the cost and inertia of the system, the latter of which may detract from the use of the system to measure the speed of delicate members. Generally the accuracy of such devices is improved by increasing the number of pulses generated per shaft revolution. However, higher pulse rates require more complex equipment. For example, in those devices using shutter wheels to produce pulses, any increase in the number of shutter wheel apertures increases the cost of the wheel and the associated optics. Further, with a large number of apertures any, even minor, disturbance or vibration may cause the generation of two pulses where there should have been only one.

In another technique, clock pulses occurring between pulses generated by shaft rotation are counted to determine the period of the shaft pulses. The period may then be inverted to determine the rate. This technique may result in poorer accuracy at higher speeds.

SUMMARY OF INVENTION

It is therefore an object of this invention to provide an improved, simpler, more accurate pulse rate measuring system whose accuracy is not compromised at low pulse rates.

It is a further object of this invention to provide such a pulse rate measuring system which uses a fixed interval to measure pulses of variable period.

It is a further object of this invention to provide an improved tachometer system which uses that pulse rate measuring system.

It is a further object of this invention to provide such a tachometer system having higher accuracy without resorting to artificially increased pulse rate.

It is a further object of this invention to provide such a tachometer system which is more rugged, more resistant to errors due to vibration, and requires less complex pulse generating means.

The invention results from the realization that an extremely accurate pulse rate measuring technique useful in a tachometer system can be effected by starting and stopping the counting of the pulses in response to the beginning and end of a fixed interval and determining the period of those pulses by measuring the elapsed time between the first and the last pulse counted, so that the time used to calculate the pulse rate is precisely that period of time defined by the pulses counted during that period.

The invention features a fixed interval, variable period method of measuring pulse rate. The invention requires defining the start and the end of a fixed measuring interval and counting pulses whose rate is measured beginning in response to the start of the measuring interval and stopping in response to the end of the measuring interval. The period of time between the occurrence of the first counted pulse and the last counted pulse is measured and is divided into the total number of pulses counted in that time in order to determine the pulse rate.

The invention also features a pulse rate measuring system having a control circuit for defining a measuring interval and indicating the start and stop of the interval. A counter circuit counts pulses whose pulse rate is to be measured and responds to a start indication from the control circuit to begin to count the pulses. The counter circuit is also responsive to a stop indication to cease counting the pulses. A timer circuit defines the beginning of a measuring period in response to the first counted pulse, and the end of a measuring period in response to the last counted pulse. There are means responsive to a stop indication for determining the pulse rate from the number of pulses counted by the counter during the measured period and the time of the measured period.

In a preferred embodiment, the counter circuit may include pulse counter means and means, responsive to the pulse counter means, for storing the present pulse count. There are also means, responsive to the means for storing the present pulse count, for storing the pulse count at the end of the last measuring interval. The timer circuit may include clock means for generating clock signals and clock counter means for counting the clock signals. First means store the present clock count, and there are means, responsive to the means for storing the present clock count, for storing the clock count at the end of the last measuring interval. The counter circuit may further include means for determining the difference between the present pulse count and the pulse count at the end of the last measuring interval. The timer circuit may further include means for determining the difference between the present clock count and the clock count at the end of the last measuring interval. The control circuit may include an interval counter and the means for determining the pulse rate may include a divider circuit.

DISCLOSURE OF PREFERRED EMBODIMENT

Other objects, features and advantages will occur from the following description of a preferred embodiment and the accompanying drawings, in which.

Figure 1:
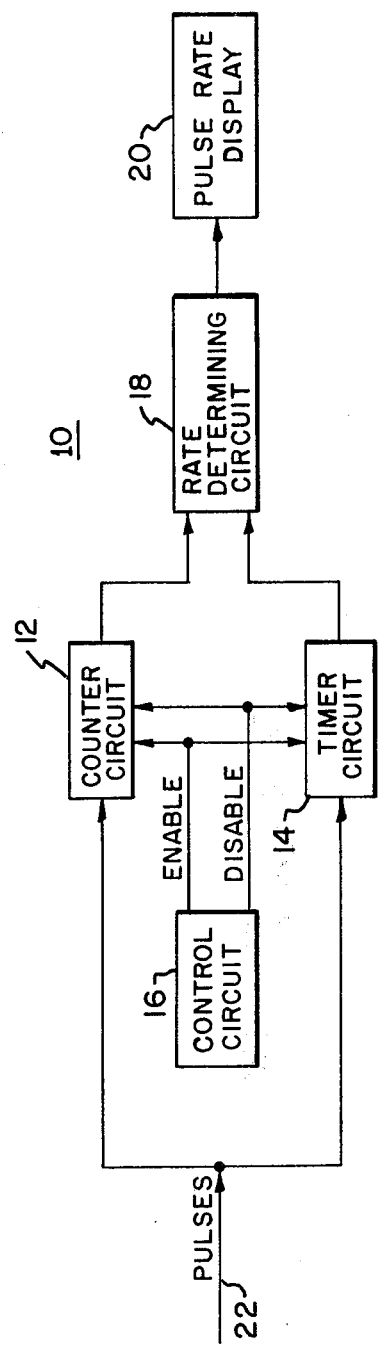
FIG. 1 is a block diagram of a pulse rate measuring system according to this invention.

The invention may be accomplished by a fixed interval, variable period pulse rate measuring system which includes a control circuit for defining a fixed measuring interval and indicating the start and stop of the interval. Such a control circuit may include simply an interval timer which is loaded with a particular preset number at the beginning of each interval and counted down, such as by clock pulses, until it reaches zero at the end of the interval. A counter circuit counts pulses after it has been instructed that the measuring interval has begun, and stops counting pulses when it has been instructed that the interval is over. The last pulse counted by the counter circuit may be the last pulse which ends just before the end of the interval or the first pulse which ends after the end of the interval, or a pulse which straddles the beginning of the interval. A timer circuit defines the beginning of a measuring period in response to the first pulse counted and measures the time from then to the end of the measuring period, which is determined in response to the last counted pulse. Thus the measured period varies from interval to interval in accordance with the relative position of the first and last counted pulses. However, the measured period always begins and ends precisely with a pulse so that the time of the period is exactly the time that has elapsed from the first pulse counted to the last pulse counted, and thus there is no error due to variations in the actual period of time elapsed between the beginning and the end of the measuring period.

Typically, the time recorded at the last ount in the last interval is stored and the time recorded for the last count in the present interval is stored, and the difference between them represents the elapsed time of the measured period. Similarly, there is means for storing the last count at the end of the last interval and the last count at the end of the present interval; the difference between the two represents the number of pulses counted during the measured period. Finally, there are means for determining the pulse rate from the number of pulses counted by the counter circuit during the measured period and the time of the measured period.

The invention may also be accomplished with a method begun by loading a predetermined number into an interval register, then decrementing the interval register and checking to see if the number in the interval register has reached zero. If it has, then the rate can be determined. If it has not, then the comparison is done between the storage register which stores the present count and the count in the counter. If they are not equal the count in the storage register is changed to equal that in the counter, and the present time is recorded from the interval register. The interval register is decremented a second time in order to maintain synchronization, and then the system returns to decrement the interval register again. If previously, when the count in the storage register was compared to that in the counter it was determined that they are equal, the system immediately returns to begin again with the decrementing of the interval register. As previously indicated, if the interval register at any time reaches zero, the pulse rate determination is made. First the difference between the pulse count at the end of the last interval and the present pulse count is determined. This represents the number of pulses counted during the present interval. Then the difference between the recorded time at the last divide operation at the end of the last interval and the present recorded time is determined in order to establish the time elapsed during the present interval. The number of pulses counted during the present interval is then divided by the time elapsed during the present interval. Finally, this pulse rate number is multiplied by some constant to represent the units of speed which the tachometer is measuring, e.g. r.p.m., r.p.s., feet per second.

There is shown in FIG. 1 a pulse rate measuring system 10 according to this invention which includes a counter circuit 12, timer circuit 14, and a control circuit 16, which selectively enables and disables the counter circuit 12 and timer circuit 14. The output of counter circuit 12 and timer circuit 14 are fed to rate determining circuit 18, which calculates the rate and displays it in pulse rate display 20. Pulses arriving on input line 22 are delivered to both counter circuit 12 and timer circuit 14. At the beginning of an interval as defined by control circuit 16, an enable signal is delivered to both counter circuit 12 and timer circuit 14. When this enable signal is present, the next pulse occurring at input line 22 causes counter circuit 12 to begin counting. Simultaneously, that count first occurring after the enable signal from control circuit 16 causes timer circuit 14 to begin measuring a period of time. At the end of the interval as determined by control circuit 16, a disable circuit signal is delivered to counter circuit 12 which causes it to stop counting. It may stop counting immediately, in which case the present count represents the last pulse counted, or it may count one more pulse after the end of the interval occurs. Timer circuit 14, which has received a disable signal from control circuit 16 at the end of the interval, also stops measuring the time of the period with the occurrence of the last pulse counted. The count thus present in counter circuit 12 may then be used along with the elapsed time period measured by timer circuit 14, in rate determining circuit 18 to determine the precise pulse rate of the pulses which have entered at input 22. The pulse rate is then displayed in suitable units on display 20.

Figure 2:
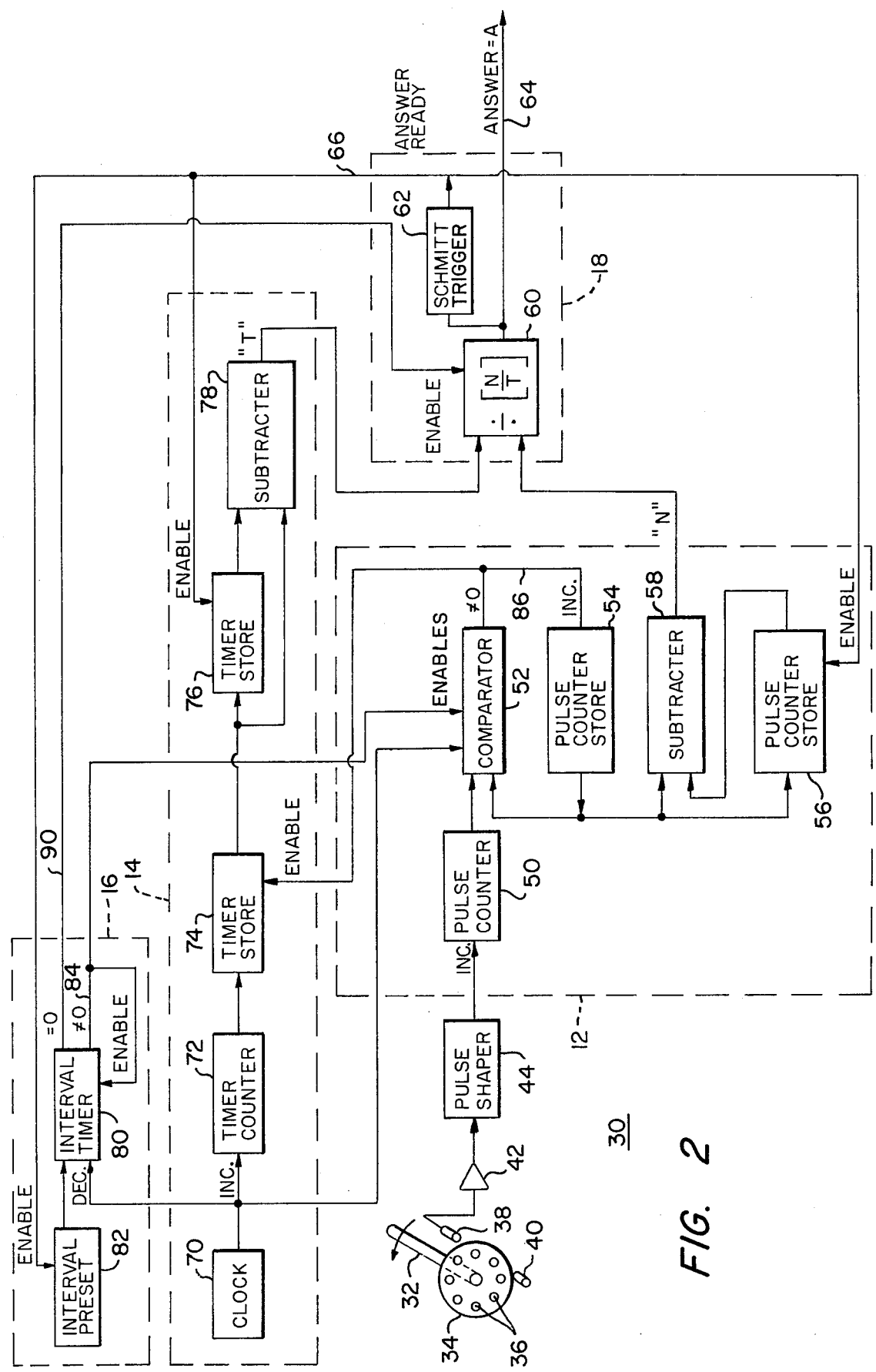
FIG. 2 is a more detailed block diagram of a pulse rate measuring system used in a tachometer system according to this invention.

A tachometer system 30, FIG. 2, incldues, in addition to the components shown in FIG. 1, a tachometer shaft 32 with shutter wheel 34 having one or more apertures 36 about its periphery. A photoelectric cell 38 senses the presence and absence of light from source 40 through aperture 36 as shaft 32 rotates. The output of photoelectric cell 38 is delivered to an amplifier 42 and the pulses are suitably conditioned in pulse shaper 44 before they are fed to counter circuit 12. Any other suitable system may be used for generating pulses proportional to shaft speed, e.g. magnetic, eddy current, mechanical switches.

Counter circuit 12 includes pulse counter 50 which counts pulses from pulse shaper 44 and indicates its present count to comparator 52. Comparator 52 compares the count in pulse counter 50 to that in a pulse counter store 54. If the counts are not equal, comparator 52 delivers a signal to pulse counter store 54 to make it equal with the count in pulse counter 50. Pulse counter store 56, when enabled, stores whatever count is present at the output of pulse counter store 54. The difference between the count present in pulse counter store 56 and that present in pulse counter store 54 is determined in subtractor 58 and delivered to divider 60 and pulse rate determining circuit 18, which also includes a pulse generating or trigger circuit 62. A divide performed by divider 60 produces an answer on output Line 64. The appearance of that answer causes trigger circuit 62 to provide an answer ready signal on line 66.

Timer circuit 14 includes a clock 70, which in this construction takes the place of a separate clock in and therefore may as well be considered as included in control circuit 16. Clock 70 provides clock pulses to timer counter 72. The present value of the count in timer counter 72 is stored in timer store 74, while the timer store 76 stores the value of the count as determined at the end of the last interval. The difference in the time stored in timer 76 and that stored in timer 74 is determined by subtractor circuit 78 and provided at the other input to divider circuit 60.

Control cicuit 16 includes an interval timer 80 and an interval preset 82, which loads a predetermined number into interval timer 80 at the beginning of each interval.

In operation, as shaft 32 rotates pulses are generated and are continuously being fed to pulse counter 50. At the beginning of an interval, interval preset circuit 82 loads a predetermined number into interval timer 80. Clock 70 immediately begins decrementing the number in interval timer 80. As long as interval counter 80 has not yet reached zero, the signal on line 84 keeps timer 80 enabled and also keeps comparator 52 enabled. Thus comparator 52 compares the value in pulse counter 50 with that in pulse counter store 54. As long as they are not equal, pulse counter store 54 is incremented by the signal on line 86 at the output of comparator 52 in order to bring the value of pulse counter store 54 up to that of pulse counter 50. The signal on line 86 also enables timer store 74 to store the present value contained in time counter 72 which is incremented at the occurrence of each clock pulse from clock 70. Typically, clock pulses are provided every 26 microseconds, and a number, 30,208, is loaded in interval timer 80, which establishes an interval of 0.785 seconds. Timer store 76 is unchanged during this time and is constantly presenting its output to subtractor 78, which sees at its other input the constantly changing value in timer store 74, which is tracking timer counter 72. Similarly, pulse counter store 56 is unaffected during this time and is constantly presenting to subtractor 58 the count stored in pulse counter store 56 at the end of the last interval. Subtractor 58 constantly receives as its other input the continually changing value in pulse counter store 54 as it tracks the value of pulse counter 50. When interval timer 80 reaches zero, it is disabled and so is comparator 52. The value in pulse counter store 54 is now frozen, as is the value in timer store 74, which no longer receives the enabling output on line 86 from comparator 52. Thus subtractor 78 and subtractor 58 are each receiving two stable inputs representing present and past times and present and past counts, respectively. At this time, interval timer 80 also provides on output line 90 an enabling signal to divider circuit 60, causing it to immediately divide the time T from subtractor 78 into the count N from subtractor 58. As soon as an answer is generated on line 64, trigger circuit 62 provides an answer ready signal on line 66. This signal enables timer store 76 to overwrite the time which has been stored in it with the time that is presently in timer store 74. Pulse counter store 56 similarly is enabled to overwrite the value stored in it with the value that is presently located in pulse counter store 54. Finally, that signal on line 66 enables interval preset 82 to once again load the number 30,208 into interval timer 80, and the interval begins again.

Figure 3:
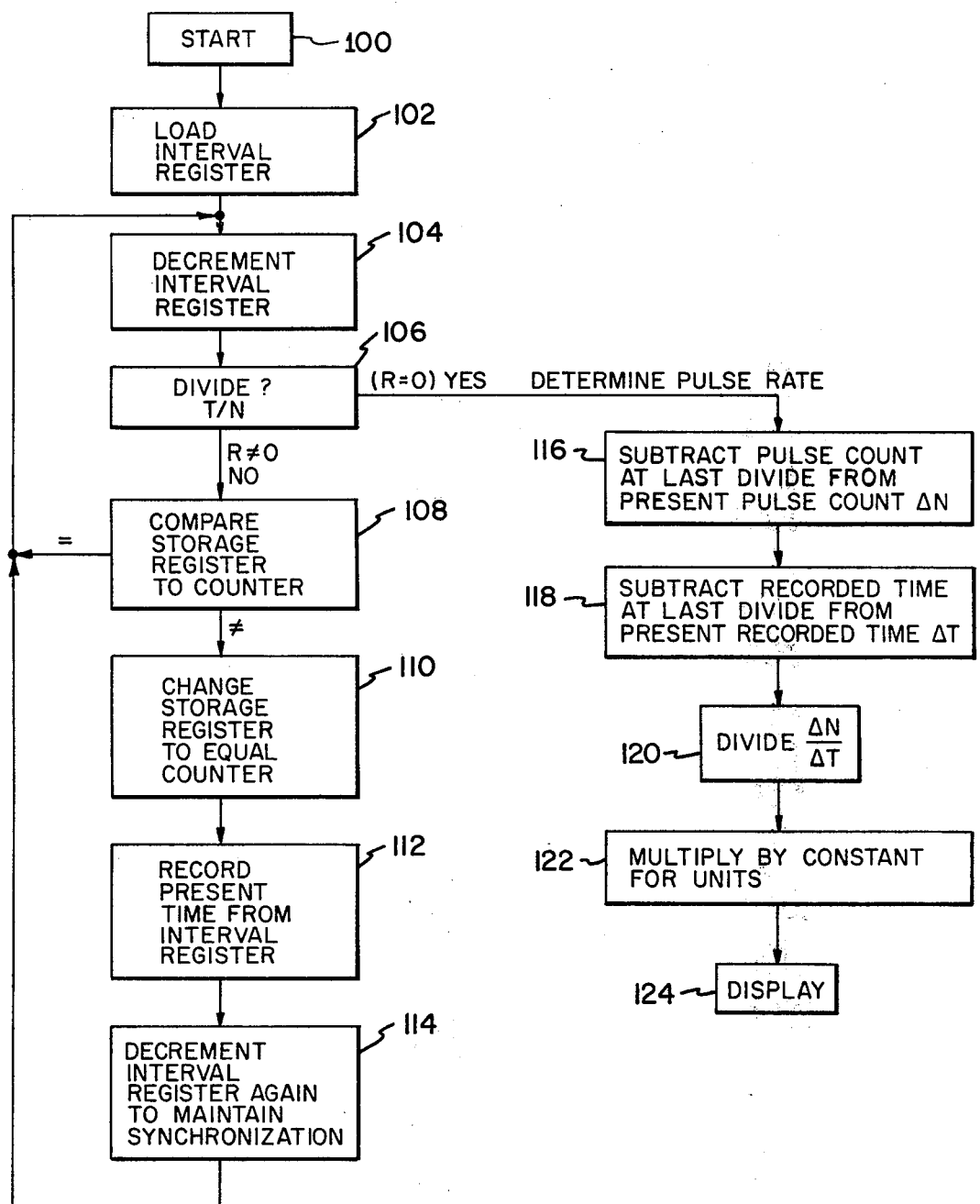
FIG. 3 is a flow chart of an implementation of a pulse rate measuring system according to this invention.

One example of a method employing the fixed interval, variable period pulse rate measuring technique according to this invention is shown in FIG. 3. At the start, 100, a number is loaded into an interval register 102. The number in the interval register is decremented, 104, representing an elapsed time of 26 micro-seconds. The next step is to determine whether or not to divide the time T into the count N in order to calculate the pulse rate, step 106. If the interval register has reached zero, the decision is made to determine the pulse rate. If it has not yet reached zero, the decision is made not to determine the pulse rate. In the latter case, the next step, 108, is to compare the count stored in the storage register to that which is in a counter. If the counts are equal, the system returns immediately to begin again with step 104. If the values of the counts are not equal, the storage register is made, 110, to bring its value equal to that of the value in the counter, and the present time as indicated by the interval register is recorded, 112. At this time the interval register is again decremented, 114, in order to compensate for the added time, that is 26 microseconds, which it takes to get from step 108 to step 114, which is in addition to the time required if at step 108 the system returned directly to step 104. After the second decrement of the interval register, step 114, the system does return to step 104.

When the interval register has reached zero, the decision is made to determine the pulse rate. First the pulse count at the last divide, which occurred at the end of the last interval, is subtracted from the present pulse count to determine ΔN, step 116, the count made during the measured period. Either before, after, or at the same time, that that subtraction is made, the recorded time at the last divide is subtracted from the present recorded time to determine ΔT, step 118. ΔN is then divided by ΔT, step 120, to determine the pulse rate, which is multiplied, 122, by a constant which assigns the proper units to the pulse rate, and the result is displayed, 124.

Other embodiments will occur to those skilled in the art and are within the following claims:

What is claimed is:

1. A fixed interval, variable period pulse rate measuring system comprising:
   a control circuit for defining a measuring interval and indicating the start and stop of said interval;
   a counter circuit responsive to a start indication from said control circuit for beginning to count pulses and responsive to a stop indication to cease counting pulses;
   a timer circuit for defining the beginning of a measuring period in response to said first counted pulse and the end of a measuring period in response to said last counted pulse; and
   means, responsive to a said stop indication, for determining pulse rate from the number of pulses counted by said counter circuit during said measured period and the time of said measured period.

2. The pulse rate measuring system of claim 1 in which said counter circuit includes pulse counter means; means, responsive to said pulse counter means, for storing the present pulse count; and means, responsive to said means for storing said present pulse count, for storing the pulse count at the end of the last said measuring interval.

3. The pulse rate measuring system of claim 1 in which said timer circuit includes clock means for generating clock signals, clock counter means for counting said clock signals, first means for storing the present clock count and means, responsive to said means for storing the present clock count, for storing the clock count at the end of the last said measuring interval.

4. The pulse rate measuring system of claim 2 in which said counter circuit further includes means for determining the difference between said present pulse count and said pulse count at the end of the last said measuring interval.

5. The pulse rate measuring system of claim 3 in which said timer circuit further includes means for determining the difference between said present clock count and said clock count at the end of the last said measuring interval.

6. The pulse rate measuring system of claim 1 in which said control circuit includes an interval counter.

7. A fixed interval, variable period tachometer system comprising:
   pulse generator means for producing pulses as a function of tachometer shaft speed;
   a control circuit for defining a measuring interval and indicating the start and stop of said interval;
   a counter circuit for counting pulses and responsive to a start indication from said control circuit for beginning to count pulses and responsive to a stop indication to cease counting pulses;
   a timer circuit for defining the beginning of a measuring period in response to said first counted pulse and the end of a measuring period in response to said last counted pulse; and
   means, responsive to said stop indicator, for determining pulse rate from the number of pulses counted by said counter circuit during said measured period and the time of said measured period.

8. The tachometer system of claim 7 in which said counter circuit includes pulse counter means; means, responsive to said pulse counter means, for storing the present pulse count; and means, responsive to said means for storing said present pulse count, for storing the pulse count at the end of the last said measuring interval.

9. The tachometer system of claim 7 in which said timer circuit includes clock means for generating clock signals, clock counter means for counting said clock signals, first means for storing the present clock count, and means, responsive to said means for storing the present clock count, for storing the clock count at the end of the last said measuring interval.

10. The tachometer system of claim 8 in which said counter circuit further includes means for determining the difference between said present pulse count and said pulse count at the end of the last said measuring interval.

11. The tachometer system of claim 9 in which said timer circuit further includes means for determining the difference between said present clock count and said clock count at the end of the last said measuring interval.

12. The tachometer system of claim 7 in which said control circuit includes an interval counter.

13. A fixed interval, variable period method of measuring pulse rate comprising:
   defining the start and the end of a fixed measuring interval;
   counting pulses whose rate is to be measured beginning with the start of the measuring interval and stopping in response to the end of the measuring interval;
   measuring the period of time between the occurrence of the first counted pulse and the last counted pulse; and
   dividing the number of pulses counted during a measuring period by the time of the period to determine the pulse rate.

* * * * *